April 23, 1929.   J. M. TEAHEN ET AL   1,710,277
METHOD AND APPARATUS FOR FORMING CERAMIC STRUCTURES
Filed Feb. 15, 1926   3 Sheets-Sheet 2
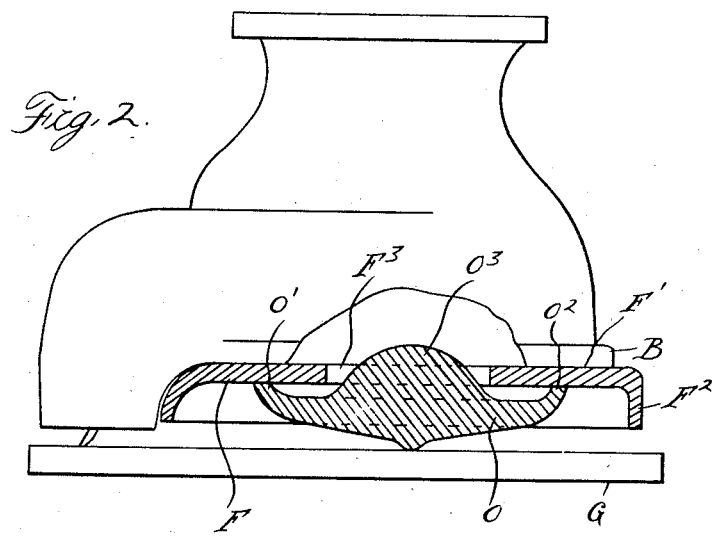
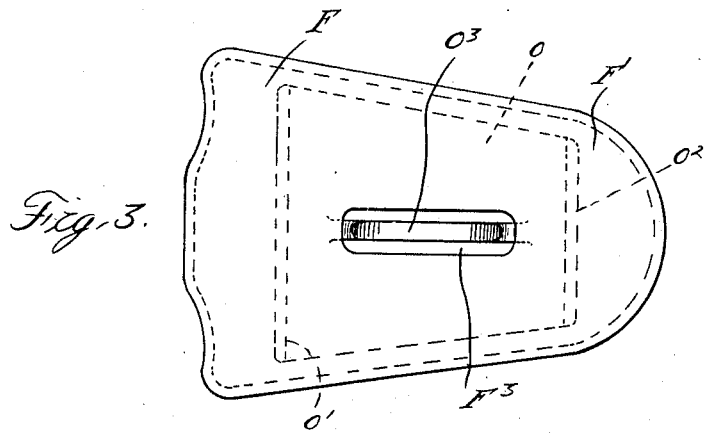
Inventors
James M Teahen
William Taylor
Attorneys Patented Apr. 23, 1929.

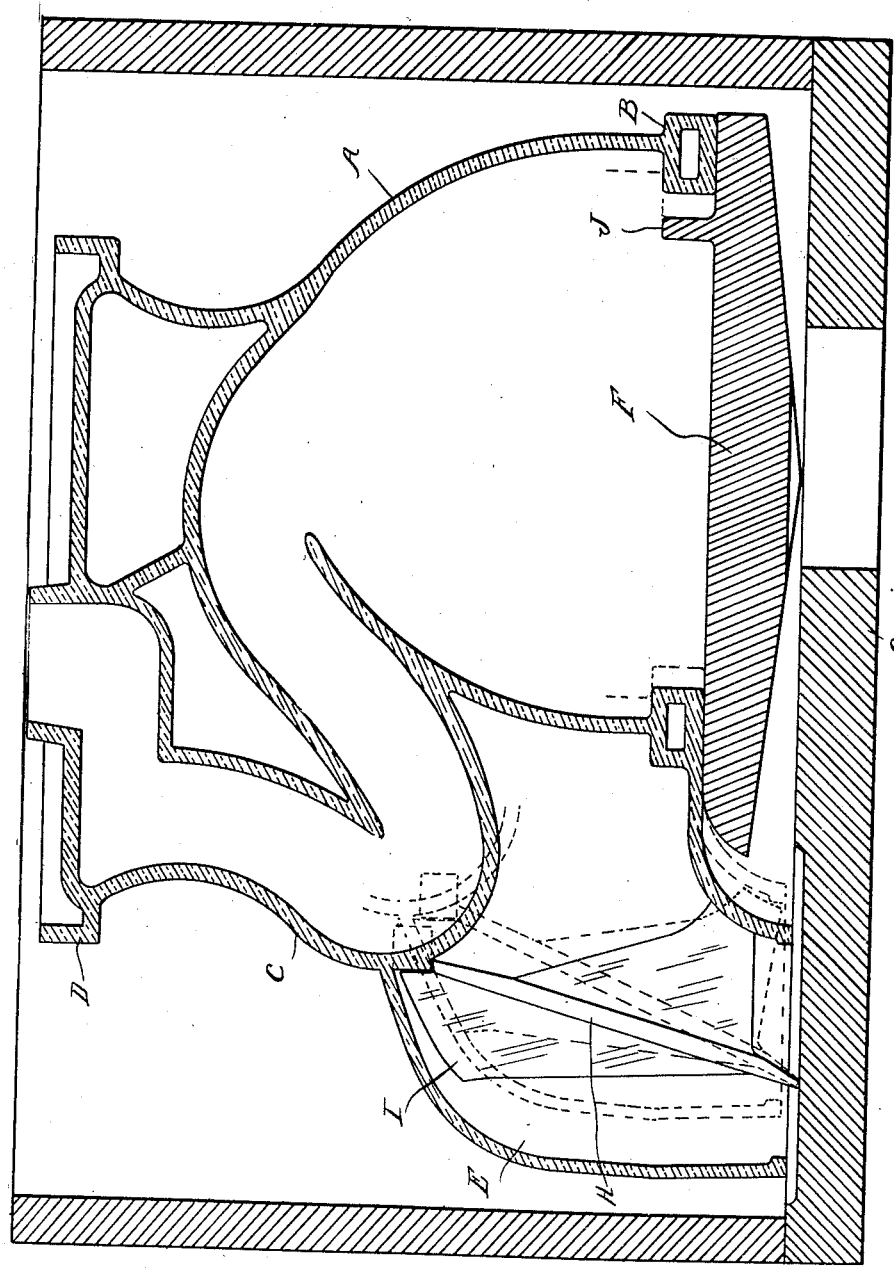

1,710,277

UNITED STATES PATENT OFFICE.

JAMES M. TEAHEN, OF DETROIT, MICHIGAN, AND WILLIAM TAYLOR, OF ROBINSON, ILLINOIS.

METHOD AND APPARATUS FOR FORMING CERAMIC STRUCTURES.

Application filed February 15, 1926. Serial No. 88,330.

The invention relates to the ceramic art and more particularly to the manufacture of clay structures which, because of complexity or peculiar form, are difficult to produce.
In the present state of the art such structures are first molded or otherwise fashioned from the plastic clay and are frequently built up of separately molded sections subsequently united to each other. The structure is then permitted to dry for a certain period of time after which it is baked in the kiln. During both the drying and the baking steps shrinkage occurs and it is exceedingly difficult with complex structures to avoid either cracking or distortion.

It is the primary object of the present invention to avoid the defects incident to shrinkage and to obtain a product which is not only free from cracks but is also held to predetermined dimensions and form. To this end the invention consists in the method and apparatus as hereinafter set forth.

While our improved process and apparatus are applicable to the manufacture of various ceramic structures, we have specifically illustrated the manufacture of water closets.

In the drawings:

Figure 1 is a vertical longitudinal section through a water closet showing apparatus for supporting the same during the firing process.

Figure 2 is a sectional elevation showing a modified construction.

Figure 3 is a plan view of Figure 2.

Figure 5:
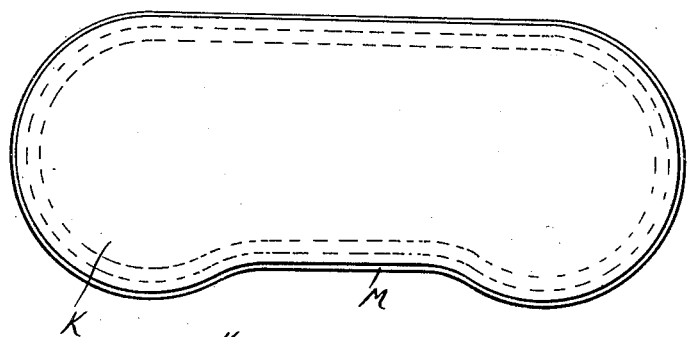
Figure 5 is a plan view thereof.
Figure 4:
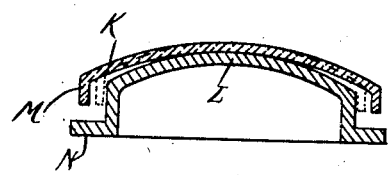
Figure 4 is a cross section showing a tank cover and the form on which it is supported.
Figure 6:
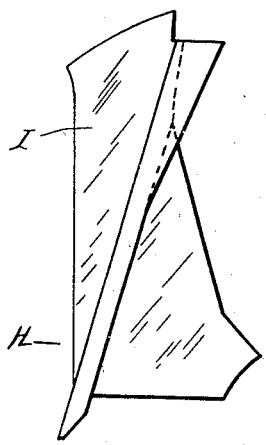
Figure 7:
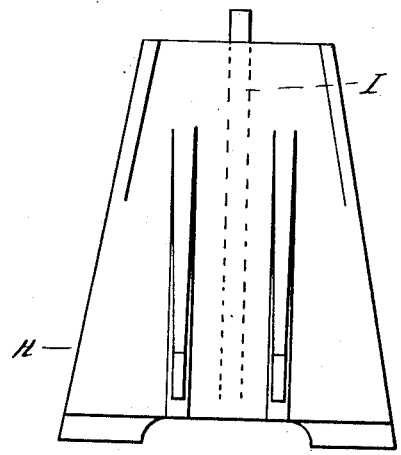
Figure 8:
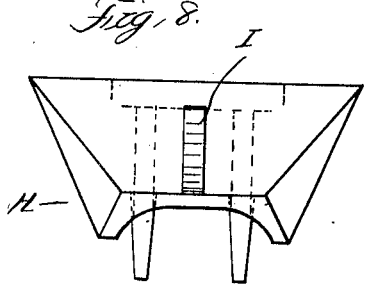

Figures 6, 7, and 8 are respectively side elevation, end elevation and plan views of the supporting stilt.

The water closet which is illustrated in the drawings is of that type in which the supply tank, bowl and siphonic trap are all formed as an integral structure. During the shrinkage process there is a tendency to contract towards the centre of mass which frequently develops internal stresses resulting either in cracks or in distortion of form. Furthermore, the structure in the green is not completely self-supporting and if the various portions are separately supported, these supports may interfere with contraction. To avoid the difficulties just referred to, the various portions of the structure are sustained by relatively freely movable supports so designed as to permit contraction. Some of these supports are also fashioned to guide the direction of shrinkage and to impart to the shrunken article an exactly predetermined form.

As specifically shown, A is the closet bowl, B the hollow rim thereof, C the siphonic trap, D the supporting base and E the tank which is in rear of the bowl and above the trap. This structure when placed in the kiln is inverted, the bowl and rim being supported upon a rocker plate F which in turn rests upon a base plate G. The tank and trap are supported by a stilt H having its lower end rockably engaging the plate G. Thus, during shrinkage the trap and tank are permitted to move toward the bowl by the rocking of the stilt H while the rocking of the plate F will compensate for any necessary change in angle. Preferably the stilt H is arranged at an oblique angle to the base G so that in tilting it not only moves the trap laterally toward the centre of mass but also permits a movement in a vertical direction. The balance is such that the rocking movements of both the stilt H and the plate F are effected with little stress in the clay walls.

In addition to the function of transporting the relatively movable parts during shrinkage, these supporting members are fashioned to form guiding forms which determine the final shape of the shrunken article. Thus, as shown, the stilt H is provided with the laterally extending ribs I of a contour corresponding to the curve of the portion of tank adjacent thereto. The rocker plate F is also provided with an annular supporting surface for engaging the rim of the bowl and holding the latter in its plane. A rib J on the rocker plate F limits the sliding movement of the rim on said plate due to the contraction in the diameter thereof and establishes an exact relation between the outer portion of said rim and the point of pivotal support for the stilt H. The stilt H, rocker plate F and base plate G are preferably formed of baked clay or other material which will not change in shape or dimensions during the firing process.

With the construction as described, in operation the clay structure, after the proper amount of preliminary drying, is mounted upon the members G, F and I and is then placed in the kiln. During the baking process, the various parts will shrink until they assume the position indicated by the dotted lines in Figure 1. This movement is permitted without resistance by the rocking of the members F and H as before described while the member H also shapes the contour of the tank to the desired form.

Other ceramic structures, such as the cover plate K for the tank, must be held to a predetermined contour or form. This is accomplished by supporting the dried clay on a member L which is complementary to the desired cross sectional contour of the inner face of the cover K after shrinkage. Originally the members L and K are of different cross sectional contour so that the member K is supported only at the centre but during shrinkage it will gradually settle down as well as shrinking toward its centre until it is in full contact with the member L. The rim M for this cover depends from the body portion thereof and to guide in the original setting of the article the supporting member L is provided with a base flange N of approximately the contour of said rim M before shrinkage. This enables the operator to place the member K upon the member L in proper alignment so that after shrinkage it will be of the desired form.

Where the walls of the dried clay structure vary in thickness there is a tendency for certain portions to more quickly heat up and therefore to distort in form. Such a tendency is overcome by varying the mass of the supporting member L with reference to the thickness of wall of the adjacent members supported thereby. Generally speaking the thin wall portions are placed adjacent to the thicker portions in the support and vice versa the thicker portions of the dried clay article are placed adjacent to the thinner portions of the support. Thus, during firing the tendency for the thinner portions to more quickly heat is nullified by their proximity to the portions of the support which are of greater thickness.

The construction shown in Figures 2 and 3 is a modification of that shown in Figure 1 designed to avoid the warping of the plate on which the bowl is supported. It is essential that the rim B of the bowl should be maintained substantially flat and to this end the upper surface of the rocker plate F lies in a plane. Inasmuch however as the rocker has a single line of support, there is tendency for the plate to warp due to internal stresses when in a highly heated condition. Such difficulty is avoided by the construction shown in Figures 2 and 3 in which the rocker support is formed of a flat plate member F' having a depending marginal strengthening flange F². This plate is supported upon a rocker member O which has upturned bearing ribs O', O² at opposite ends thereof which engage the plate F' at points between the centre and opposite ends thereof. The rocker member O is further provided with an upwardly extending flange or rib O³ which constitutes a truss to increase the strength of said member and this rib may project through a slot F³ in the plate F'.

With the construction just described the weight of the bowl which is carried into the plate F' is distributed therefrom to the two ribs O' and O² which carry the stresses into the rocker member O. This relieves the plate F' from any tendency to warp while any warping or change of shape of the member O will not materially affect its function.

What we claim as our invention is:

1. In a process for manufacturing ceramic structures, the step of relatively movably supporting spaced portions of an integral ceramic structure to be freely relatively movable in the direction of shrinkage between said portions and in applying a force for urging said portions in the said direction of movement.

2. An apparatus for supporting ceramic structures during the shrinkage thereof comprising a plurality of supporting bearings for engaging different portions of an integral ceramic body, said bearings being relatively movable in the direction of shrinkage between said integral body portions.

3. An apparatus for supporting ceramic structures during the heat treatment thereof comprising a plurality of supporting bearings for engaging different portions of an integral ceramic body, said bearings being relatively movable in the direction of shrinkage between said integral body portions.

4. An apparatus for supporting ceramic bodies during the heat treatment thereof comprising a plurality of supporting bearings for engaging spaced portions of an integral ceramic body, said bearings being relatively rockable to permit free movement of said portions in the direction of shrinkage.

5. An apparatus for supporting ceramic structures during the heat treatment thereof comprising a rockable bearing for supporting one portion of an integral ceramic structure and a rockable stilt for supporting another portion of said structure, said rockable members being so positioned as to permit by their relative rocking movements the free movement of the portions supported thereby in the direction of shrinkage.

6. In an apparatus for supporting ceramic structures during heat treatment thereof comprising a member on which said structure rests fashioned to the desired form of the surface contacting therewith, and a rockable member having distributed bearings for supporting said plate and relieving the same from warping stresses.

7. In a process for manufacturing ceramic structures, the step of placing a ceramic body in proximity to a substantially rigid pattern or form and subjecting said body during shrinkage to the action of a force for conforming the same to said pattern.

8. In a process for manufacturing ceramic structures the step of supporting a ceramic body on a portion of a substantially rigid pattern and conforming said body to other portions of said pattern during shrinkage by the action of gravity.

9. In a process for manufacturing ceramic structures varying in mass in different portions thereof, the step of placing the body during heat treatment adjacent to another having its mass varied to control the temperature in said different portions.

10. In a process for manufacturing ceramic structures, the step of floatingly supporting spaced portions of an integral ceramic structure to permit substantially frictionless relative movement thereof in the direction of shrinkage.

11. In a process for manufacturing ceramic structures, the step of rockably supporting spaced portions of an integral ceramic structure to permit substantially frictionless free relative movement thereof in the direction of shrinkage.

12. In a process for manufacturing ceramic structures, the step of supporting a ceramic body during heat treatment thereof adjacent to a substantially rigid pattern and so as to have portions of said body freely movable relative to said pattern and the point of support whereby said body will be conformed to a contour of said pattern during shrinkage.

In testimony whereof we affix our signatures.

JAMES M. TEAHEN.
WILLIAM TAYLOR.